Feb. 24, 1953 L. VARADY 2,629,314
ROTATING ELECTRICAL BROILER
Filed Feb. 8, 1952 4 Sheets-Sheet 3

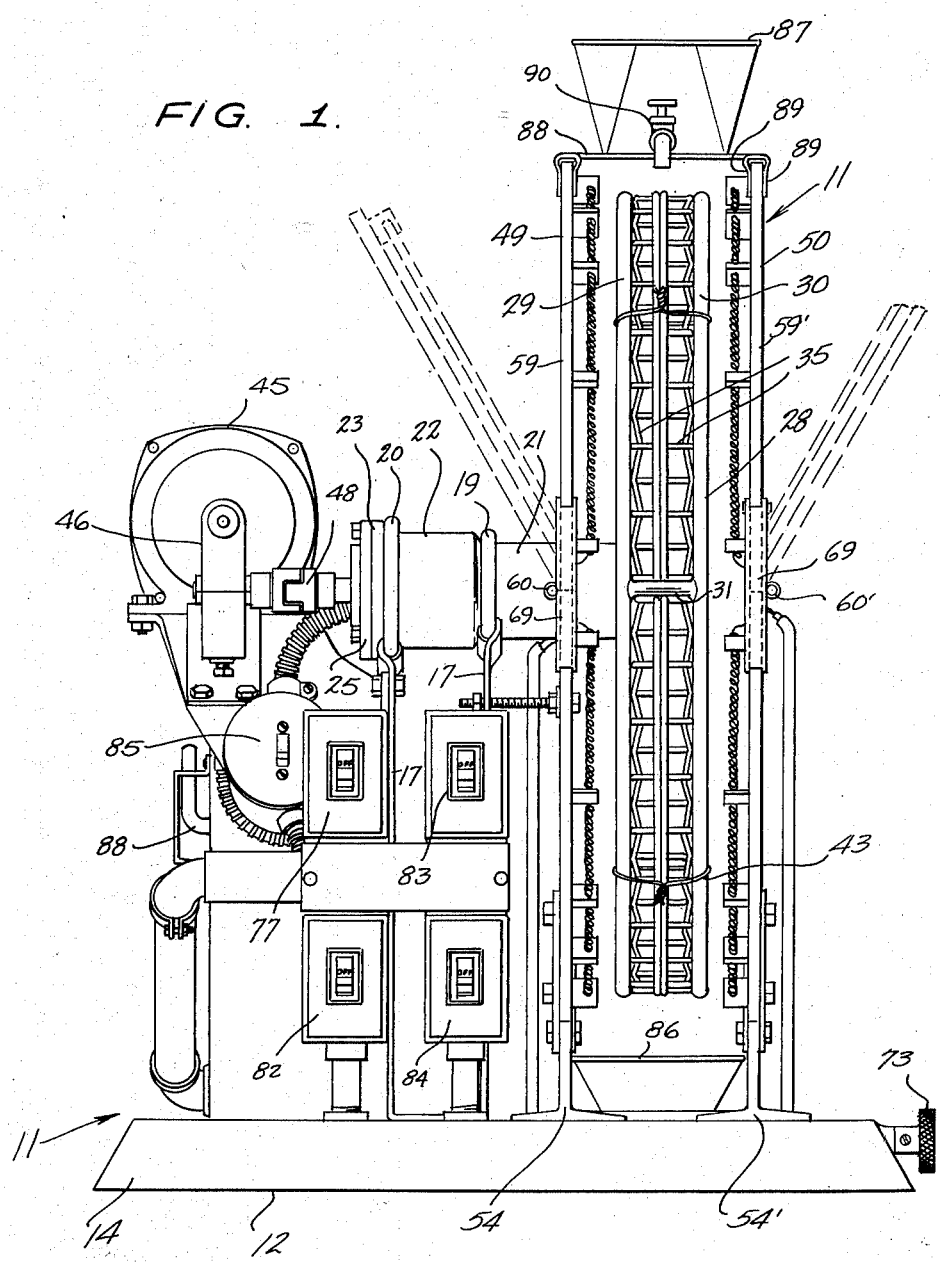

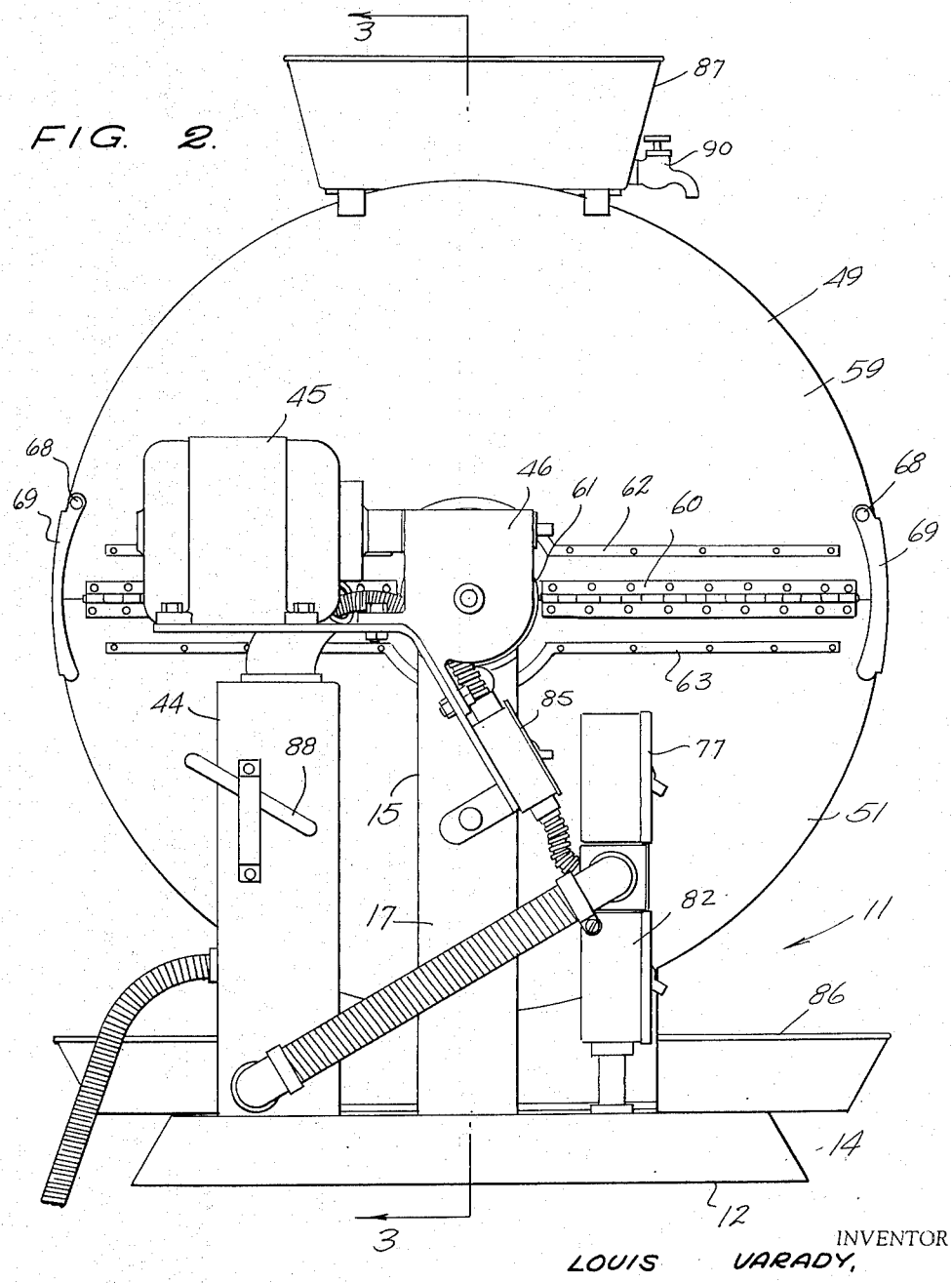

INVENTOR
LOUIS VARADY,
BY
McMorrow, Berman & Davidson
ATTORNEYS

Feb. 24, 1953  L. VARADY  2,629,314
ROTATING ELECTRICAL BROILER
Filed Feb. 8, 1952  4 Sheets-Sheet 4

INVENTOR
LOUIS VARADY,
BY
McMorrow, Berman & Davidson
ATTORNEYS

Patented Feb. 24, 1953

2,629,314

UNITED STATES PATENT OFFICE 2,629,314

ROTATING ELECTRICAL BROILER

Louis Varady, Fords, N. J.

Application February 8, 1952, Serial No. 270,577

3 Claims. (Cl. 99—427)

This invention relates to electrical broilers, and more particularly to mechanically driven rotating electrical broilers.

The main object of the invention is to provide a novel and improved mechanically driven electrical broiler which is simple in construction, which is easy to operate and which is arranged to broil a plurality of articles of food, such as steaks, chops, and the like, within a short period of time to a degree of tenderness not hitherto obtainable.

A further object of the invention is to provide an improved mechanically driven rotating electrical broiler which involves inexpensive components, which is durable in construction, and which is adapted to broil a plurality of food articles, such as steaks, chops and the like, to a degree of tenderness not hitherto obtainable, the tenderness resulting from the conservation of the natural juices of the food articles, the degree of broiling and the time involved in the broiling process being readily regulated.

A still further object of the invention is to provide an improved mechanically driven rotating electrical broiler adapted to broil a plurality of food articles simultaneously, the improved broiling device being relatively compact in size, being easy to maintain in operating order, being easy to clean, and being arranged to automatically baste the food articles as they are being broiled and to provide a degree of tenderness not hitherto obtainable as well as to preserve the natural flavor of the food articles during the broiling process.

Further objects and advantages of the invention will become apparent from the following description and claims, and from the accompanying drawings, wherein:

Figure 1 is a side elevational view of an improved mechanically driven, rotating electrical broiler constructed in accordance with the present invention.

Figure 2 is an end elevational view of the electrical broiler shown in Figure 1.

Figures 3, 7:
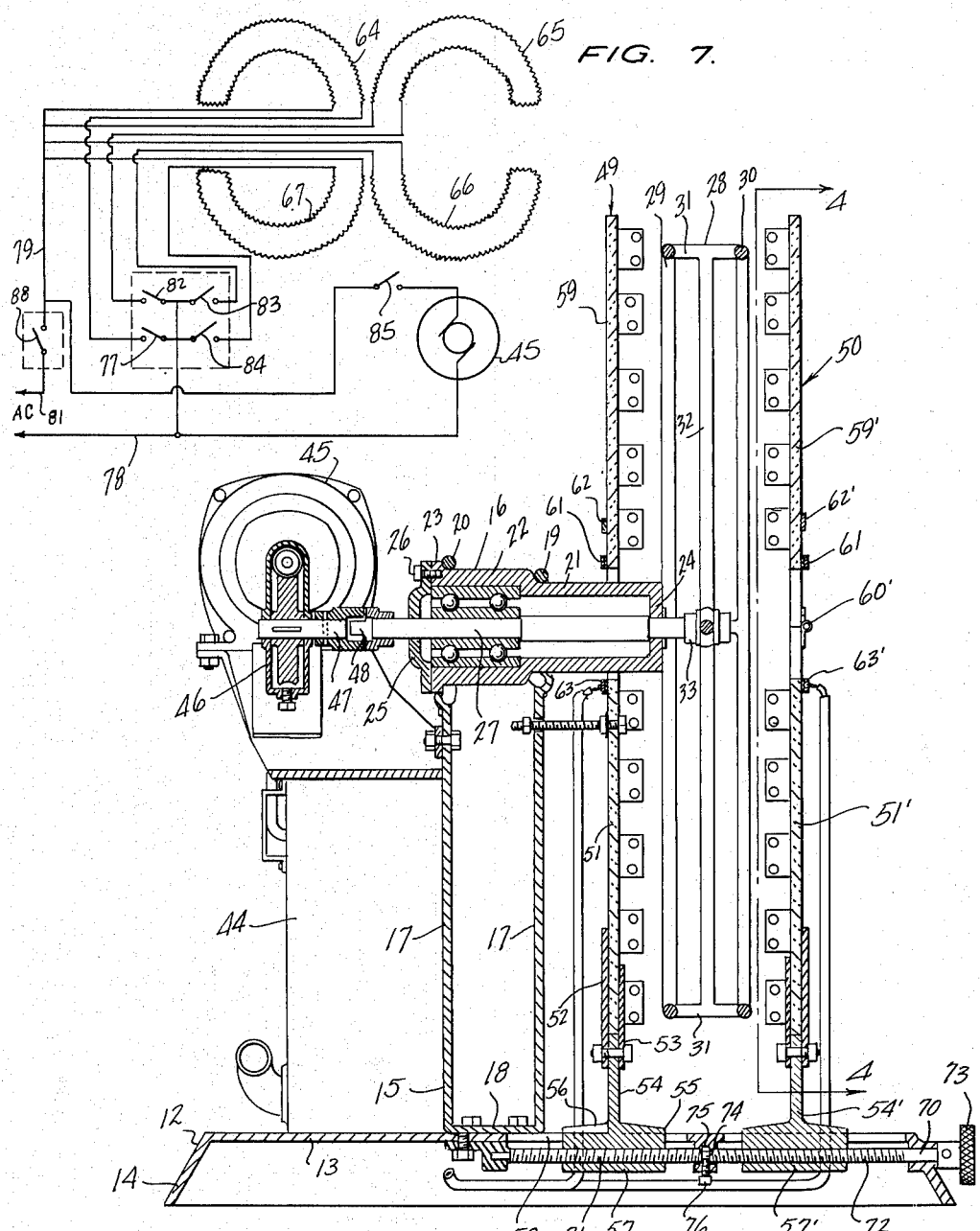
Figure 3 is a vertical cross sectional view taken on the line 3—3 of Figure 2.
Figure 7 is a schematic wiring diagram showing the electrical connections of one of the heating elements of the broiling device of Figures 1 to 4.

Referring to the drawings, the improved electrical broiler is designated generally at 11 and comprises a base 12 having a top wall 13 and inclined peripheral walls 14. Secured to the intermediate portion of the base 12 is the upstanding hollow post member 15, and secured to the top end of said post member 15 is the horizontal bearing sleeve 16. The post member 15 may comprise, for example, a strip of bar stock bent into U-shape to define the parallel vertical side arms 17, 17 and the bight portion 18 which is rigidly secured to the top wall 13 of the base 12. Secured to the top ends of the side arms 17, 17 are the respective clamping rings 19 and 20 which engage around the bearing sleeve 16, as shown in Figures 1 and 3. The bearing sleeve 16 comprises a reduced forward portion 21 and a larger rear portion 22, the ring 20 engaging around the rear portion of the enlarged sleeve element 22 and abutting the end flange 23 of said sleeve element, as shown in Figure 3. The ring 19 engages the reduced forward portion 21 of the sleeve adjacent the shoulder defined between said reduced portion 21 and the larger rear portion 22. The reduced sleeve portion 21 is provided with the end wall 24, and a cap member 25 is secured to the rear end of the larger sleeve portion 22 by bolts 26 engaging with the peripheral flange 23.

Supported upon the base 12 for rotary movement about a horizontal axis is a circular grill carrier 28. Specifically journaled axially in the bearing sleeve 16 is the horizontal shaft 27 which extends rotatably through the forward wall 24 of the sleeve and the cap member 25. Secured to the forward end of the shaft 27 is the circular basket carrier 28 which comprises a pair of spaced relatively stiff wire rings 29 and 30 connected by spaced cross bar elements 31 at their peripheries, said cross bar elements having rigidly connected to their intermediate portions the radial rod elements 32 which are in turn rigidly connected to a hub 33 rigidly secured on the forward end of shaft 27. There are four radial rod elements 32, spaced at 90° relative to each other, defining four quadrant-shaped spaces between the ring members 29 and 30.

Figure 5:
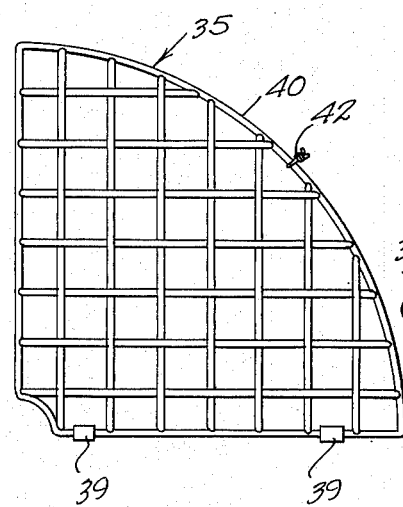
Figure 5 is a side elevational detail view of one of the grill members employed in the electrical broiler of Figures 1 to 4.
Figure 6:
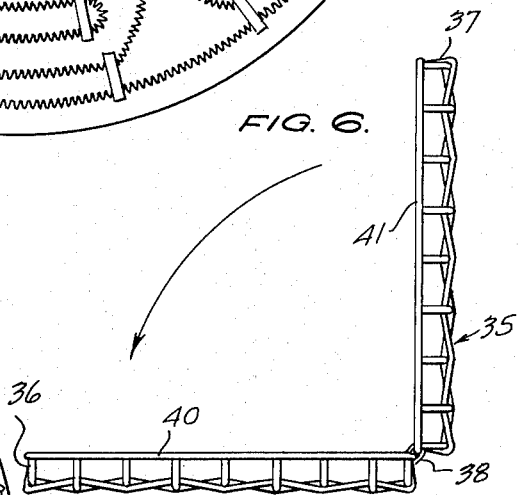
Figure 6 is an end elevational view of the grill device of Figure 5, shown in open position.

Referring to Figures 5 and 6, 35 generally designates a foldable grill member adapted to be received in one of the quadrant-shaped spaces in the basket carrier 28. As shown in Figures 5 and 6, the grill element comprises a pair of relatively shallow, quadrant-shaped segments 36 and 37 hinged together along their respective radial edges, as shown at 38, by a plurality of hinge sleeves 39, the shallow grill segments 36 and 37 being formed of wire mesh, as shown. Food articles are adapted to be disposed between the shallow wire mesh receptacles 36 and 37 and to be secured therebetween by folding said segments together and fastening the arcuate, abutting rim elements 40 and 41 thereof, shown in Figures 5 and 6, by short pieces of wire 42 engaged around the rim elements 40 and 41. Alternatively, the food articles may be placed between the grill segments 36 and 37, and the grill segments may be inserted, in closed positions, into the quadrant-shaped spaces defined between the basket rings 29 and 30, and each closed grill member 35 may be retained in the quadrant-shaped space of the basket carrier 28 by engaging a short piece of wire 43 around the ring elements 29 and 30 and around the rim wires 40 and 41 of the grill member 35 in the manner shown in Figure 1, the ends of the wire 43 being twisted together to secure same.

Secured to the base 12 rearwardly adjacent to the post member 15 is an upstanding housing 44 on the top end of which is mounted the electric motor 45 which is provided with the speed reducing gear unit 46. The output shaft 47 of the gear unit 46 is coupled by conventional coupling means 48 to the rear end of the shaft 27.

Designated at 49 and 50 are respective opposing parallel upstanding, flat circular heating elements which are adjustably mounted on the base 12 on opposite sides of the basket carrier 28, as shown in Figure 3. The heating element 49 comprises a lower asbestos, semicircular panel 51 which is secured by strap members 52 and 53 to the upstanding web 54 of a transversely extending T-bar 55 having its base flange 56 slidably supported on the top wall 13 of base 12. Base flange 56 is provided with a depending transverse rib 57 extending slidably through a slot 58 formed in top wall 13. Designated at 59 is a second semicircular asbestos panel which is connected at its horizontal diameter to the horizontal top diameter of the lower panel 51 by a metal, horizontally extending hinge 60, as shown in Figure 1. The mating central portions of the diametrical edges of the panels 51 and 59 are arcuately notched to provide clearance for the reduced sleeve portion 21, and the hinge elements on opposite sides of the aperture thus defined are connected together electrically by an arcuate strap member 61. Secured to the upper panel 59 above the hinges 60 is a conducting bar 62. Secured to the lower panel 51 is a similar conducting bar 63 which is spaced below the hinge elements 60, as shown in Figure 2. Mounted on the respective asbestos panels 51 and 59 are a plurality of heating coils which are interconnected in a suitable manner, utilizing the conductor bars 62 and 63 and the metal hinge elements 60 to define four separate heating elements 64, 65, 66 and 67.

Figure 4:
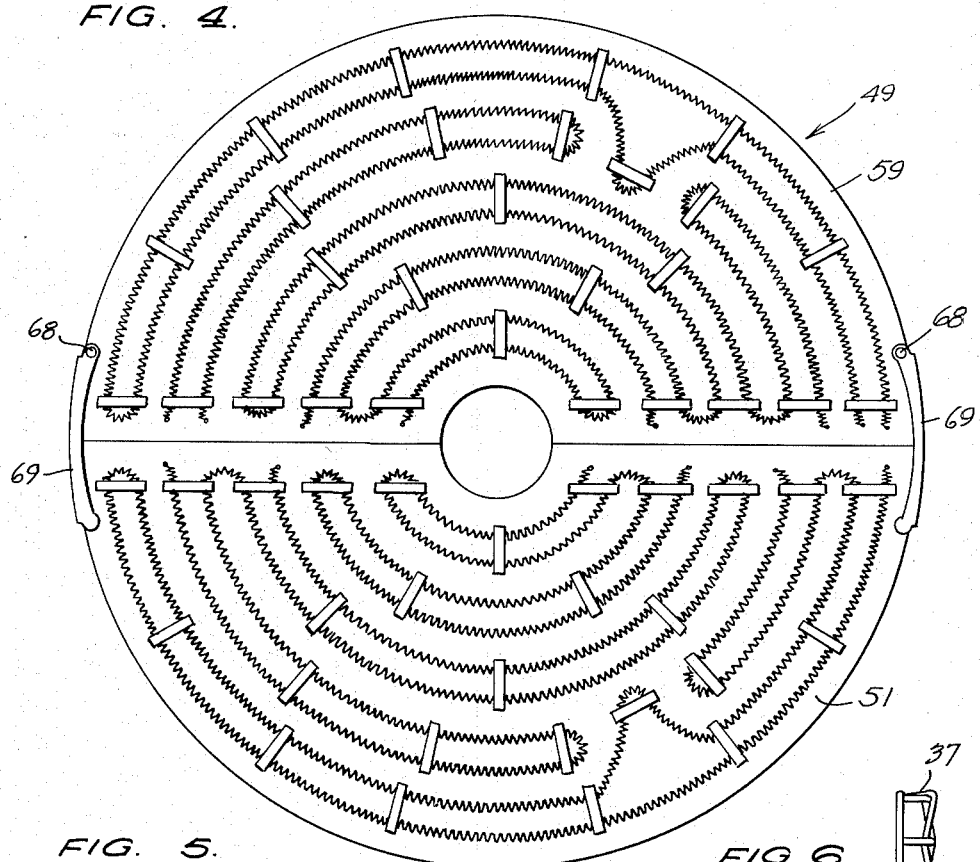
Figure 4 is a cross sectional detail view taken on the line 4—4 of Figure 3.

Interengaging means on the swingable portion or upper panel 59 and the other portion of the circular heating element 49 or panel 51 lock the swinging portion to the other portion of the heating element 49. Specifically, pivotally connected to the upper panel 59 at 68, 68 are the respective channel-shaped, arcuate clip members 69, 69 which are arranged to overlap the joint between the segments 59 and 51 and to lockingly receive the peripheral edge portions of the lower segment 51 adjacent said joint. When the peripheral edge portions of the hinged semicircular segments 51 and 59 are thus received in the respective, channel-shaped clips 69, 69, in the manner shown in Figure 4, the segments 51 and 59 are locked in coplanar relationship. When the clip members 69, 69 are swung outwardly, the upper segment 59 may be swung away from the basket carrier 28 to provide convenient access to said carrier.

The heating element 50 is similar in construction to the heating element 49, and its supporting T-bar 54' is provided with a depending transverse rib 57' which extends through the slot 58 and which is in alignment with the rib 57. The heating element 50 comprises the lower asbestos panel 51' and the upper asbestos panel 59' hinged thereto at 60' and provided with the transversely extending conductor bars 62' and 63', as well as with the arcuate connecting strap 61 which electrically connects its hinge element 60'. The panel segments 59' and 51' are locked in coplanar relationship by the provision of channel-shaped clips similar to the clips 69, 69, pivoted to the upper segment 59' and arranged to receive the opposite peripheral edge portions of the lower segment 51' in the manner described in connection with the heating element 49. When said channel-shaped clips are disengaged from the lower segment 51', the upper segment 59' may be swung away from the basket carrier 28 to provide convenient access to said basket carrier, as in the case of the heating element 49.

Designated at 70 is a horizontally extending adjusting screw which is rotatably mounted in the base 12 below and parallel to the slot 58 and which is provided with the oppositely threaded portions 71 and 72 which are in respective threaded engagement with the depending ribs 57 and 57', whereby the heating elements 49 and 50 may be simultaneously moved toward or away from the basket carrier 28 by rotating the knob 73 provided on the external end of the screw 70, as shown in Figure 3. The intermediate portion of the screw 70 is rotatably supported in a depending bearing lug 74 formed in the wall 13, and the portion of said screw extending through the lug 74 is grooved at 75 to receive the end of a retaining screw 76 threaded through the bottom of the lug 74, whereby the screw 70 may be restrained against endwise movement after it has been properly positioned on the base 12.

The heating element 50 is provided with the heating coils, similar to those provided on the heating element 49, and said coils are arranged to define four independent circuits, similar to the four circuits 64 to 67 provided on the heating element 49. The respective circuits 64 are connected in parallel through a conventional control switch 77 to one of the line wires 78, as shown in Figure 7. The heating elements 64 have their opposite terminals connected to a wire 79 connected through a master control switch 80 to the other line wire 81. Similarly, the circuits 65, 66 and 67, of the respective heating elements 49 and 50 are connected in parallel and through respective switches 82, 83, and 84 to the line wires 78, the opposite terminals of said circuits 65, 66 and 67, being connected to the wire 79. The motor 45 has one terminal thereof connected to the line wire 78 and the other terminal thereof connected through a control switch 85 to the wire 79, whereby the master switch 80 controls the motor 45 simultaneously with the heating circuits of the heating elements 49 and 50. The switches 82, 83, 84 and 77 provide independent control of the respective heating circuits 64 to 67 on the heating elements, whereby the degree of heat radiated by the heating elements 49 and 50 to the basket carrier 28 positioned therebetween may be regulated. The degree of heat may also be regulated by rotating the knob 73 of shaft 70 to change the spacing of the heating elements relative to the basket carrier 28, as above explained.

Removably mounted on the base 12 between the T-bars 54 and 54', below the basket carrier 28 is the drip tray 86 which is arranged to receive any liquids dripping from the food articles carried in the grill members 35 during the broiling process. Designated at 87 is a basting tray which is mounted on a pair of transversely extending bracket bars 88 provided at their ends with spaced depending fingers 89, 89 adapted to receive therebetween the top edges of the asbestos panel segments 59 and 59', whereby the basting tray 87 may be supported above the basket carrier 28, as shown in Figure 1. The basting tray 87 is provided at one end thereof with a faucet 90 which is arranged to allow a desired amount of liquid to drip from the tray 87 onto the food articles carried in the grill members 35 as said grill members are rotated between the heating elements 49 and 50 during the broiling process.

The speed reduction mechanism 46 provides a speed of approximately thirty-five revolutions per minute for the shaft 27, causing the basket carrier to rotate at the same speed. The grill members 35 contain the food articles to be broiled, and may be employed to contain food of any thickness, such as steaks, chops, fowl, and the like, as will be readily understood. The revolutions of the basket carrier 28 produce a self-basting process, namely, as the basket carrier rotates, the juices coming from the cooked product spread from one side of the product to the other without dripping off to any substantial degree. As above explained, the adjustment of cooking intensity can be accomplished by either moving the panels closer together or further away from the food, or by regulating the degree of heat furnished by the heating elements 49 and 50 by means of the control switches 77, 82, 83 and 84. Furthermore, the degree of cooking intensity may be regulated by varying the length of time during which the machine is in operation. The basting tray 87 may be employed to baste the food articles being broiled with any desired flavoring liquid, such as wine sauce or the like.

As above explained, the natural juices of the food articles being broiled are preserved by the self-basting process resulting from rotation of the food articles as they are being broiled, whereby relatively little of the natural juices of the food articles is lost and whereby the natural flavor of the food articles is preserved.

While a specific embodiment of an improved mechanically driven electrical broiling device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An electrical broiler comprising a base, a pair of opposing parallel upstanding flat circular heating elements adjustably secured to said base, a rotary shaft journaled on said base normal to said heating elements and extending centrally therethrough, a circular grill secured to said shaft between said flat heating elements, said grill being arranged to receive food articles to be broiled for rotation of said food articles past the opposing surfaces of the heating elements, said heating elements each comprising a pair of semicircular segments, means hingedly connecting said segments at their diametrical edges, and a channel-shaped clip pivotally connected to the end of one of the segments and arranged to lockingly engage the adjacent end of the other segment to releasably lock the segments in coplanar relationship.

2. An electrical broiler comprising a base, a pair of opposing parallel upstanding flat circular heating elements connected at their lower portions to said base for simultaneous movement toward and away from each other, and a circular grill carrier positioned between said heating elements and supported upon said base for rotary movement about a horizontal axis, said grill being arranged to receive food articles to be broiled for rotation of said food articles past the opposing surfaces of the heating elements, said heating elements each having a portion swingable from the upstanding position to a position outwardly of the upstanding position.

3. An electrical broiler comprising a base, a pair of opposing parallel upstanding flat circular heating elements connected at their lower portions to said base for simultaneous movement toward and away from each other, a circular grill carrier positioned between said heating elements and supported upon said base for rotary movement about a horizontal axis, said grill being arranged to receive food articles to be broiled for rotation of said food articles past the opposing surfaces of the heating elements, said heating elements each having a portion swingable from the upstanding position to a position outwardly of the upstanding position, and interengaging means on the swingable portion and the other portion of each of said heating elements for locking said swinging portion and the other portion of each heating element when the swinging portion is in its upstanding position.

LOUIS VARADY.

REFERENCES CITED

The following references are of record in the file of this patent:

UNITED STATES PATENTS

| Number | Name | Date |
| --- | --- | --- |
| 570,957 | Richards | Nov. 10, 1896 |
| 1,361,183 | Reed | Dec. 7, 1920 |
| 1,477,343 | Griffin | Dec. 11, 1923 |
| 1,541,472 | Born | June 9, 1925 |
| 1,610,370 | Guy-Pell | Dec. 14, 1926 |
| 1,713,303 | Serrell | May 14, 1929 |
| 2,020,446 | Weisel | Nov. 12, 1935 |
| 2,047,046 | Wade | July 7, 1936 |
| 2,470,645 | Reichart | May 17, 1949 |
| 2,506,931 | Lopes | May 9, 1950 |